United States Patent [19]
Sagiyama et al.

[11] Patent Number: 5,700,951
[45] Date of Patent: Dec. 23, 1997

[54] TESTING APPARATUS OF STEERING SYSTEM

[75] Inventors: Tatsuya Sagiyama, Okazaki; Fumihiko Baba, Nagoya; Kaname Saito, Okazaki; Takashi Matsushima, Sayama; Hitoshi Iizuka, Sayama, all of Japan

[73] Assignees: Toyota Jidosha Kabushiki Kaisha, Aichi-ken; Kabushiki Kaisha Saginomiya Seisakusho, Tokyo, both of Japan

[21] Appl. No.: 654,592

[22] Filed: May 29, 1996

[30] Foreign Application Priority Data

Jun. 8, 1995 [JP] Japan .................. 7-141907

[51] Int. Cl.$^6$ .................................................. G01M 17/06
[52] U.S. Cl. ...................... 73/11.08; 73/11.04; 73/11.07; 73/669; 73/816
[58] Field of Search .................. 73/11.04, 1.07, 73/1.08, 663, 669, 798, 816

[56] References Cited

U.S. PATENT DOCUMENTS

| | | | |
|---|---|---|---|
| 3,713,330 | 1/1973 | Lentz | 73/798 |
| 3,718,033 | 2/1973 | Petersen | 73/669 |
| 4,263,809 | 4/1981 | Petersen et al. | 73/669 |
| 4,672,844 | 6/1987 | Meyer | 73/118.1 |
| 4,685,656 | 8/1987 | Haeg | 73/798 |
| 5,111,685 | 5/1992 | Langer | 73/117 |
| 5,465,615 | 11/1995 | Petersen et al. | 73/669 |
| 5,487,301 | 1/1996 | Muller et al. | 73/798 |
| 5,533,403 | 7/1996 | Haeg et al. | 73/669 |
| 5,569,836 | 10/1996 | Hill | 73/11.07 |

FOREIGN PATENT DOCUMENTS

A-62-225923  10/1987  Japan .
A-4-204236   7/1992   Japan .

OTHER PUBLICATIONS

Jidosha Gijutsu, vol. 45, No. 9 (1991), "Development of Power Steering Dynamic Load Simulator", Tatsuya Sagiyama et al., pp. 26–32.

*Primary Examiner*—Elizabeth L. Dougherty
*Assistant Examiner*—Eric S. McCall
*Attorney, Agent, or Firm*—Oliff & Berridge

[57] ABSTRACT

A testing apparatus of a steering system is provided to correctly detect load in a direction in which steering reaction force acts, the load being applied to the steering system. A tie rod connected to a rack of the steering system is connected to a steering-angle vibrating unit via a torque lever, relay links and a drive link. A front link of the drive link and a link disposed parallel to the torque lever are provided in a swingable manner. Both ends of each of the relay links are respectively connected to the torque lever and the link disposed parallel to the torque lever, and the torque lever is swingable with respect to the link in a direction in which road-surface reaction force acts. Transducers are provided at intermediate portions of the relay links, respectively. A vertically-vibrating unit is connected via the torque lever to the rack.

17 Claims, 4 Drawing Sheets

TESTING APPARATUS OF STEERING SYSTEM

BACKGROUND OF THE INVENTION

1. Field of the Invention

The present invention relates to a testing apparatus of a steering system, and particularly to a testing apparatus of a steering system having a loading device for applying, to the steering system, load of a direction in which steering reaction force acts, and a loading device for applying, to the steering system, load of a direction in which road-surface reaction force acts.

2. Description of the Related Art

A steering system of a vehicle is subjected to a performance test of load characteristics and the like after having been manufactured and before being installed in an actual vehicle. An example of the testing apparatus is disclosed in Japanese Patent Application Laid-Open (JP-A) No. 4-204236.

As shown in FIG. 4, in a testing apparatus 70 of a steering system, a rack 74 within a steering system 72 (i.e., the portion of the steering system 72 at the position where front wheels are mounted) is clamped by clamp members 76, 78 from both ends thereof and load is applied to the rack 74. At the same time, a pinion shaft 80 of the steering system 72 (i.e., the portion of the steering system 72 at the position where a steering wheel is mounted) is driven by a servomotor 82 and torque reaction force which acts on the shaft of the servomotor 82 when driving is detected by a torque transducer 84. Further, voltage-controllable power brakes 86, 88 which are used as the means for applying load in a stationary steering state to the rack 74, are respectively provided to ball screw shafts 94, 96 fixed to the clamp members 76, 78 via ball screw nuts 90, 92, respectively. For this reason, it becomes possible to effect non-stage setting of load to be applied to the rack 74 so as to easily and correctly set an arbitrary load.

In the testing apparatus 70 of the steering system, both end portions of the rack 74 are provided to press against transducers 104, 106 which are mounted to the clamp members 76, 78 via pressing members 100, 102, respectively. As these transducers 104, 106, there are used transducers using strain gauges to allow detection of low-frequency force.

Accordingly, when a case of inputting, to the steering system 72, load of a direction in which road-surface reaction force acts is taken into consideration, in addition to load of a direction in which steering reaction force acts, force of a direction in which steering reaction force acts (which will be hereinafter referred to as inertia reaction force), generated by the load of the direction in which road-surface reaction force acts, acts on these transducers 104, 106. A strain generating portion itself of a strain gauge is vibrated by the inertia reaction force and strain is generated therein. Namely, output Ft of the transducers 104, 106 equals the sum of actual force (load) Fo of the direction in which steering reaction force acts and axial-direction output Fh of the transducers 104, 106 by the inertia reaction force, namely, Ft=Fo+Fh.

For this reason, it is not possible to correctly detect the actual load of the direction in which steering reaction force acts.

SUMMARY OF THE INVENTION

In view of the above-described circumstances, it is an object of the present invention to provide a testing apparatus of a steering system which can correctly detect the load of the direction in which steering reaction force acts, which is to be applied to the steering system.

In accordance with the present invention, there is provided a testing apparatus of a steering system, having a first loading device for applying, to the steering system, load in a direction in which steering reaction force acts, and a second loading device for applying, to the steering system, load in a direction in which road-surface reaction force acts, the testing apparatus comprising: first links formed from a pair of parallel link portions; and second links which include a pair of parallel link portions disposed in a direction crossing the first links, each of the pair of parallel link portions of the second links being connected to the first links at two points such that one of the first links can be displaced with respect to the other in the direction in which road-surface reaction force acts and the first links can swing, wherein the second loading device and a wheel-side connecting portion of the steering system are connected to the one of the first links; the first loading device is connected to the other of the first links via a connecting mechanism which allows the other of the first links to swing, with a central portion of two connecting points of the second links and the other of the first links serving as a center of rotation, due to loading of the first loading device; and a first load detector is mounted to one of the second links and a second load detector is mounted to the other of the second links.

According to the testing apparatus of the steering system of the present invention, when load in the direction in which road-surface reaction force acts is applied to the one of the first link from the second loading device, the first link moves in parallel in a direction along the second link by the connecting mechanism and the one of the first link swings with respect to the other in the direction in which road-surface reaction force acts.

In this case, the first load detector and the second load detector which are respectively mounted to the second link are subjected to inertia reaction force.

On the other hand, when load in the direction in which steering reaction force acts is applied to the other of the first link via the connecting mechanism from the first loading device, the other of the first link swings with the central portion of the two connecting points of the second link and the other of the first link serving as the center of rotation, and the one of the second link moves in a direction in which it is compressed and the other of the second link moves in a direction in which it is pulled out, and at the same time, reaction force is applied to a rod of the steering system from the one of the first link.

Accordingly, the load in the direction in which the steering reaction force acts is detected, as those having different directions and the same absolute value, by the first load detector and the second load detector which are mounted to the second link.

On the other hand, inertia reaction force, which is generated by vertical swinging of the first load detector and the second load detector due to the load in the direction in which road-surface reaction force acts, is detected as loads having the same direction and the same absolute value by the first load detector and the second load detector. For this reason, inertia reaction force is canceled by the difference of detection values of the first load detector and the second load detector.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS

Figure 1:
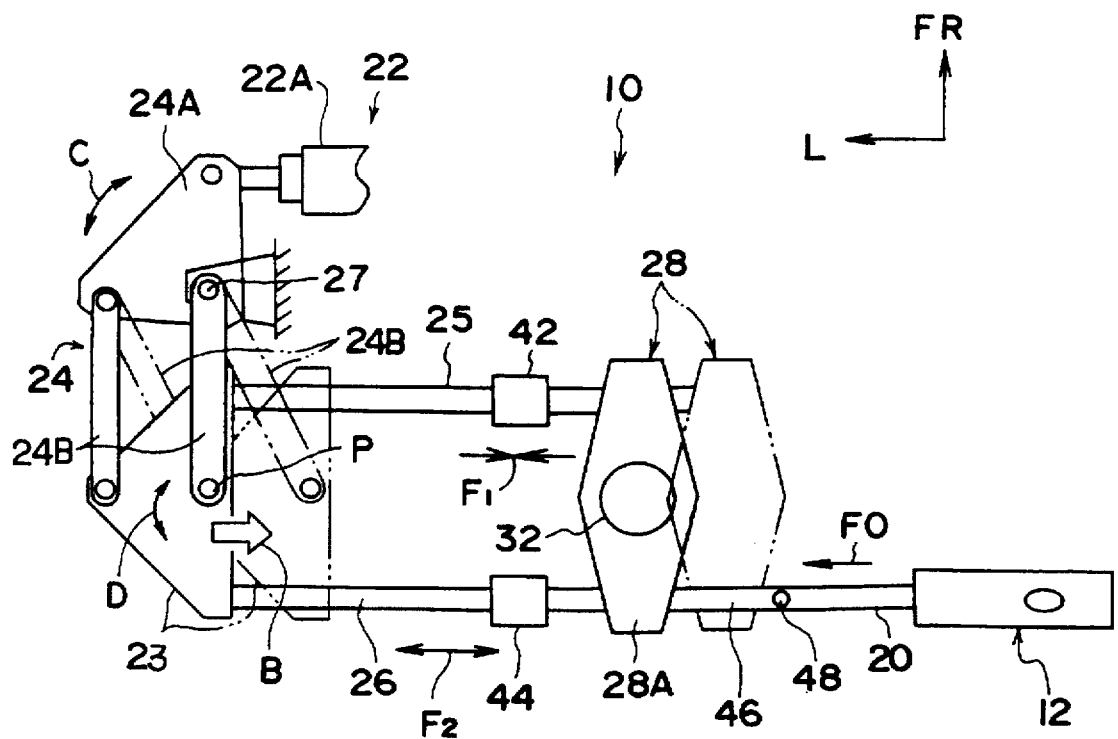
FIG. 1 is a plan view showing a portion of a left half section of a testing apparatus of a steering system according to an embodiment of the present invention.

Referring now to FIGS. 1 through 8, a description will be given of an embodiment of a testing apparatus of a steering system according to the present invention.

It should be noted that arrows "FR", "UP" and "L" shown in these drawings, respectively represent: a forward direction of a testing apparatus; an upward direction of the testing apparatus; and a left direction thereof.

As shown in FIG. 8, a testing apparatus 10 of a steering system according to the present embodiment includes a steering-system supporting table 14 to which a steering system 12 to be tested is mounted. A steering-angle vibrating unit 16 is connected to a steering shaft to which an unillustrated pinion shaft of the steering system 12 mounted on the steering-system supporting table 14 is connected. The steering-angle vibrating unit 16 is connected to an operation instructing section 18 using a personal computer, and on the basis of the instructions from the operation instructing section 18, effects steering of the steering system 12.

A steering-angle vibrating unit 22 serving as a first loading device is provided in a base portion 10A of the testing apparatus 10. A tie rod 46 connected to a rack 20 of the steering system 12 is connected to the steering-angle vibrating unit 22 via a torque lever 28 forming one side of a first link, relay links 25, 26 serving as a second link, a link 23 forming the other side of the first link, and a drive link 24 serving as a connecting mechanism. Further, the steering-angle vibrating unit 22 is connected to the operation instructing section 18, and on the basis of the instructions from the operation instructing section 18, the steering-angle vibrating unit 22 applies, to the steering system 12, load of a direction in which steering reaction force acts.

As shown in FIG. 1, a hydraulic cylinder 22A of the steering-angle vibrating unit 22 is connected to a front link 24A of the drive link 24. The front link 24A is swingable around a fixed support shaft 27 and on a horizontal plane due to actuation of the hydraulic cylinder 22A. The link 23 is connected to the front link 24A of the drive link 24 by parallel links 24B serving as a part of the drive link 24. The link 23 can be displaced in parallel in a direction along the relay links 25, 26 (i.e., the left-and-right direction in FIG. 1) as indicated by the imaginary lines in FIG. 1, and synchronously with swinging of the front link 24A, the link 23 is swingable around a connecting point P of the parallel link 24B and the link 23 and on the horizontal plane.

Figure 2:
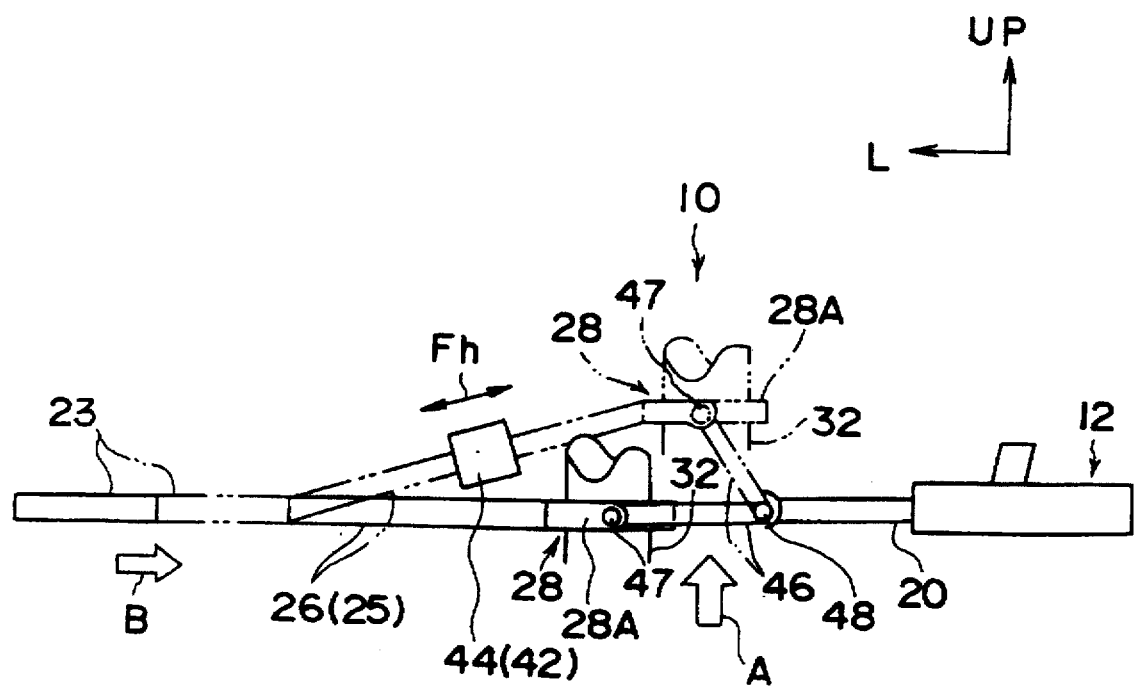
FIG. 2 is a rear view showing the portion of the left half section of the testing apparatus of the steering system according to the embodiment of the present invention.

As shown in FIG. 2, the rack 20 of the steering system 12 is connected to the tie rod 46 via a ball joint 48 and the tie rod 46 is connected to the rear end portion of the torque lever 28 via a ball joint 47. A vibrating shaft 32 whose axial direction coincides with the vertical direction is connected integrally with the torque lever 28 at the substantially central portion in the longitudinal direction of the torque lever 28.

Figure 3:
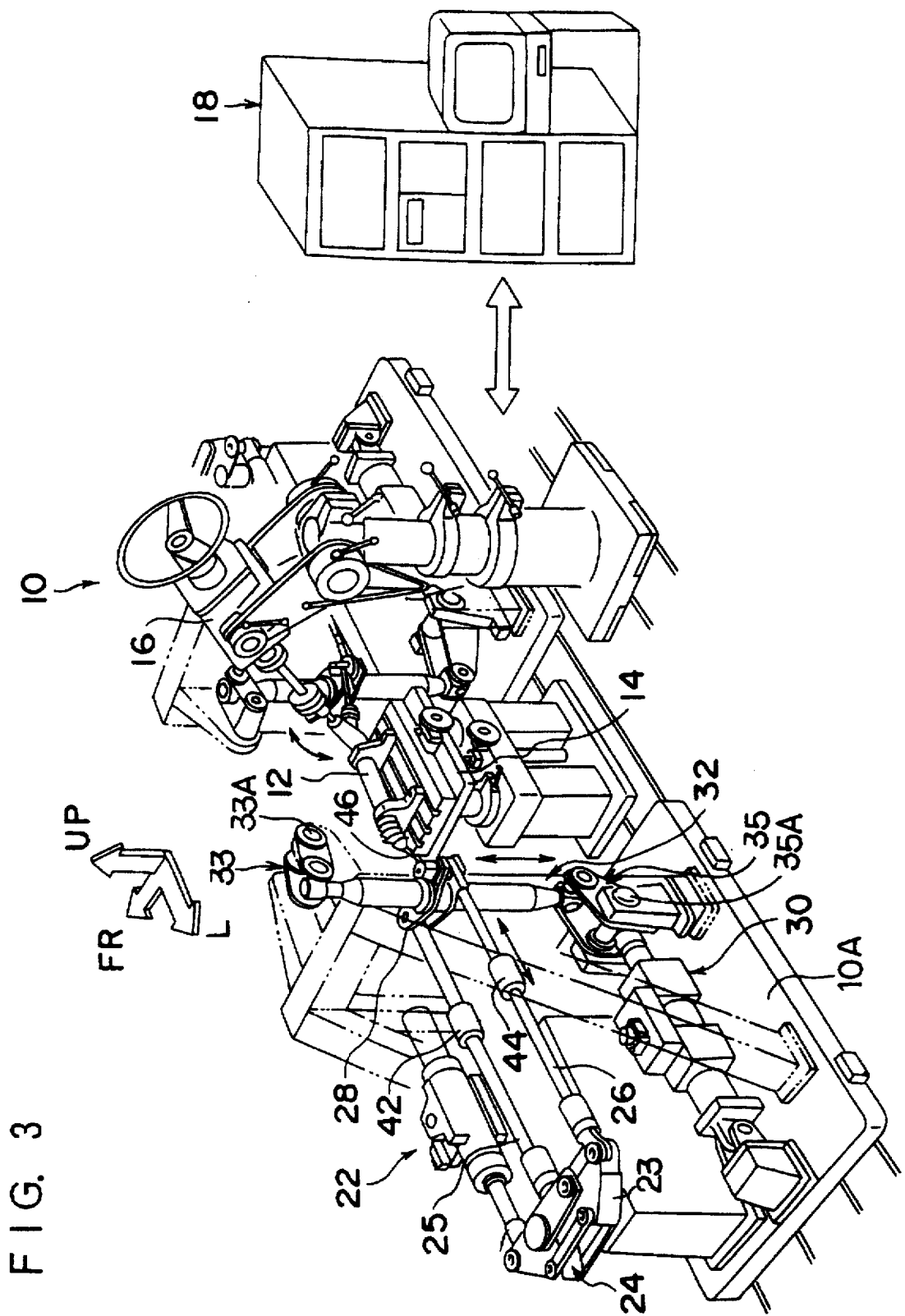
FIG. 3 is a perspective view showing the testing apparatus of the steering system according to the embodiment of the present invention.
Figure 4:
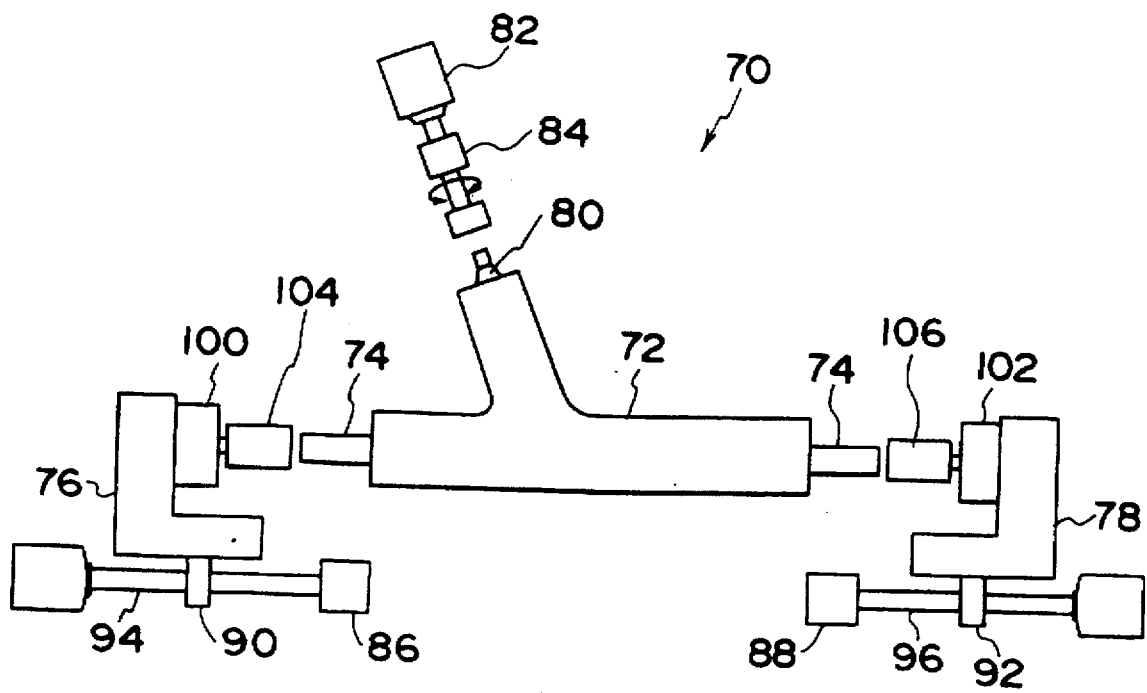
FIG. 4 is a schematic front view showing a conventional testing apparatus of a steering system.

As shown in FIG. 3, upper and lower ends of the vibrating shaft 32 are connected to an asymmetric link formed from an upper link section 33 and a lower link section 35 via ball joints, and in conjunction with swinging of the torque lever 28 on the horizontal plane, the vibrating shaft 32 is rotatable around the axis thereof with these ball joints serving as supporting points.

Further, the upper link section 33 and the lower link section 35 are connected to the base portion 10A of the testing apparatus 10 in such a manner as to be swingable around pivotally supporting points 33A, 35A, respectively. It should be noted that the pivotally supporting point 33A of the upper link section 33 and the ball joint 48 (see FIG. 2) between the tie rod 46 and the rack 20 are located on one hyperbola and the pivotally supporting point 35A of the lower link section 35 is located on a hyperbola symmetric with respect to the former hyperbola, so as to cause the movement of the tie rod 46 to approach that when running of an actual vehicle as far as possible. A hydraulic cylinder of a vertically-vibrating unit 30 serving as a second loading device is connected to the lower link section 35.

The vertically-vibrating unit 30 is connected to the operation instructing section 18 and operates on the basis of the instructions from the operation instructing section 18, thereby causing the torque lever 28 mounted to the vibrating shaft 32 to move.

As shown in FIG. 1, the torque lever 28, relay links 25, 26, and the link 23 are provided to have the shape of a rectangle when seen from a plan view. The relay links 25, 26 are disposed parallel to each other in the front-and-back direction and both end portions of each of the relay links 25, 26 are respectively connected to the torque lever 28 and the link 23. As shown in FIG. 2, the torque lever 28 is swingable with respect to the link 23 in the direction in which road-surface reaction force acts (i.e., the vertical direction on the paper of FIG. 2).

As shown in FIG. 1, a transducer 42 serving as a first load detector is provided at a central portion of the front-side relay link 25 and the output of the transducer 42 is set so as to have a positive value when the transducer 42 is compressed. A transducer 44 serving as a second load detector is provided at a central portion of the rear-side relay link 26 and the output of the transducer 44 is set so as to have a positive value when the transducer 44 is compressed.

Meanwhile, although not illustrated in FIGS. 1 and 2, the steering-angle vibrating unit 22 and the vertically-vibrating unit 30 are also connected to the right-hand end of the steering system 12 in a manner similar to those connected to the left-hand end of the steering system 12.

Next, an operation of the present embodiment will be described.

As shown in FIG. 2, when load in a direction in which road-surface reaction force acts (for example, the direction indicated by arrow A in FIG. 2) is applied to the testing apparatus 10 of the steering system according to the present embodiment by the vertically-vibrating unit 30 (see FIG. 3), the torque lever 28 swings with respect to the link 23 in the direction in which road-surface reaction force acts (i.e., the direction of arrow A in FIG. 2) as indicated by the imaginary lines in FIG. 2. As a result, the link 23 is displaced in parallel in a direction along the relay links 25, 26 (i.e., the direction indicated by arrow B in FIG. 1) as indicated by the imaginary line in FIG. 1.

In this case, as shown in FIG. 2, axial-direction outputs Fh of the transducers 42, 44 respectively mounted at the relay links 25, 26, which are caused by reaction forces (inertia reaction force) generated synchronously with the parallel movements of the relay links 25, 26 in the direction along the relay links 25, 26, are applied to the transducers 42, 44. The outputs Fh have the same absolute value and the same sign. It should be noted that the axial-direction output Fh of the transducers 42, 44 due to the inertia reaction force is the product of mass m of the transducers 42, 44 and acceleration $\alpha$ (Fh=m×$\alpha$).

On the other hand, when load in a direction in which steering reaction force acts is applied to the testing apparatus 10 by the steering-angle vibrating unit 22, the front link 24A of the drive link 24 swings around the support shaft 27 on the horizontal plane and in the directions indicated by double-headed arrow C in FIG. 1, and the link 23 swings on the horizontal plane and in the directions indicated by double-headed arrow D in FIG. 1 with the connecting point P of the link 23 and the parallel link 24B connected to the support shaft 27 serving as the center of rotation. For this reason, when the link 23 swings in the forward direction of the directions of arrow D, compressive force and tensile force are applied to the relay link 25 and the relay link 26, respectively. When the link 23 swings in the backward direction of the directions of arrow D, tensile force and compressive force are applied to the relay link 25 and the relay link 26, respectively. Namely, when compressive force is applied to the transducer 42, tensile force is applied to the transducer 44, and when tensile force is applied to the transducer 42, compressive force is applied to the transducer 44. In other words, outputs F1, F2 of the transducers 42, 44 have the same absolute value and only signs thereof are opposite to each other.

When the output F2 of the transducer 44 is subtracted from the output F1 of the transducer 42, the axial-direction outputs Fh of the transducers 42, 44 due to inertia reaction force are canceled, and only actual force (load) F0 in the direction in which steering reaction force acts, which is applied to the left-hand end of the rack 20 of the steering system 12, can be detected.

For example, the output F1 of the transducer 42 equals F0/2+Fh and the output F2 of the transducer 44 equals −F0/2+Fh. For this reason, when tensile force F2 of the transducer 44 is subtracted from compressive force F1 of the transducer 42, the output Ft to be detected is obtained as Ft=F0, so that actual load F0 in the direction in which steering reaction force acts, which is applied to the left-hand end of the rack 20 of the steering system 12, can be correctly detected as output Ft.

Further, in the testing apparatus of the steering system according to the present embodiment, as compared with a conventional apparatus, vertical-direction input can be applied to the steering system and load of quick movement (high-frequency force) can also be applied thereto. Accordingly, the load in the testing apparatus approaches that when running of an actual vehicle and experimental accuracy improves.

Meanwhile, in the above-described embodiment, the outputs of the transducers 42, 44 are each set so as to have a positive value when the transducers 42, 44 are compressed. However, the outputs of the transducers 42, 44 may be each set so as to have a negative value when the transducers 42, 44 are compressed. When the outputs of the transducers 42, 44 have values of the same sign, load F0 in the direction in which steering reaction force acts can be correctly detected from a difference between the outputs of the transducers 42, 44. Further, the outputs of the transducers 42, 44 may be set so as to have values of different signs (for example, the output of one of transducers is positive and the output of the other is negative) when these transducers are compressed. In this case, it is possible to correctly detect, from the sum of the outputs of the transducers 42, 44, load F0 in the direction in which steering reaction force acts.

In this way, so long as, when the same load is applied to the transducers 42, 44, these transducers are provided to output detection values having the same absolute value, load in the direction in which steering reaction force acts can be detected from the difference between the outputs of the transducers 42, 44 or from the sum of the outputs of the transducers.

As described above, the present invention is constructed in that, in the testing apparatus of the steering system, having the first loading device for applying, to the steering system, load in the direction in which steering reaction force acts, and the second loading device for applying, to the steering system, load in the direction in which road-surface reaction force acts, the testing apparatus comprising: the first link formed from a pair of parallel link portions; and the second link which includes a pair of parallel link portions disposed in a direction crossing the first link, each of the pair of parallel link portions of the second link being connected to the first link at two points such that one of the first link can be displaced with respect to the other in the direction in which road-surface reaction force acts and the first link can swing, wherein the second loading device and a wheel-side connecting portion of the steering system are connected to the one of the first link; the first loading device is connected to the other of the first link via a connecting mechanism which allows the other of the first link to swing, with a central portion of two connecting points of the second link and the other of the first link serving as a center of rotation, due to loading of the first loading device; and the first load detector is mounted to one of the second link and the second load detector is mounted to the other of the second link. Accordingly, the present invention has an excellent effect of making it possible to correctly detect the load in the direction in which steering reaction force acts which is applied to the steering system.

While the embodiment of the present invention, as herein disclosed, constitutes a preferred form, it is to be understood that other forms might be adopted.

What is claimed is:

1. A testing apparatus of a steering system, having a first loading device for applying, to the steering system, load in a direction in which steering reaction force acts, and a second loading device for applying, to the steering system, load in a direction in which road-surface reaction force acts, said testing apparatus comprising:
   first links formed from a pair of parallel link portions; and
   second links which include a pair of parallel link portions disposed in a direction crossing said first links, each of the pair of parallel link portions of said second links being connected to said first links at two points such that one of said first links can be displaced with respect to the other in the direction in which road-surface reaction force acts and said first links can swing,
   wherein the second loading device and a wheel-side connecting portion of the steering system are connected to the one of said first links;

the first loading device is connected to the other of said first links via a connecting mechanism which allows the other of said first links to swing about a center of rotation in a central portion of said other of said first links between two connecting points of said second links to said other of said first links, due to loading of the first loading device; and a first load detector is mounted to one of said second links and a second load detector is mounted to the other of said second links.

2. A testing apparatus of a steering system according to claim 1, wherein the first loading device is a steering-angle vibrating unit.

3. A testing apparatus of a steering system according to claim 1, wherein the second loading device is a vertically-vibrating unit.

4. A testing apparatus of a steering system according to claim 1, wherein the one of said first links is a torque lever to which a vibrating shaft, whose axis is substantially vertical is integrally connected at a substantially central portion in a longitudinal direction of the torque lever, and the second loading device is connected to the one of said first links via the vibrating shaft.

5. A testing apparatus of a steering system according to claim 4, wherein upper and lower ends of the vibrating shaft are connected to an asymmetric link formed from an upper link section and a lower link section via ball joints, and synchronously with swinging of the torque lever on a horizontal plane, the vibrating shaft is rotatable around the axis thereof with these ball joints serving as supporting points.

6. A testing apparatus of a steering system according to claim 5, wherein a pivotally supporting point of the upper link section and the lower link section, and the wheel-side connecting portion of the steering system are located on a hyperbola.

7. A testing apparatus of a steering system according to claim 1, wherein the wheel-side connecting portion of the steering system is a rack of the steering system and is connected via a tie rod to a rear end portion of the one of said first links.

8. A testing apparatus of a steering system according to claim 1, wherein the connecting mechanism is a drive link including a front link and a parallel link, the front link being provided to be swingable on a horizontal plane and around a fixed support shaft due to actuation of the first loading device connected to the front link and the parallel link connecting the front link and the other of said first links.

9. A testing apparatus of a steering system according to claim 1, wherein the first and second load detectors are transducers.

10. A testing apparatus of a steering system according to claim 1, wherein the first and second load detectors are respectively set so as to detect outputs which have identical signs when compressed.

11. A testing apparatus of a steering system according to claim 10, wherein said identical signs are positive.

12. A testing apparatus of a steering system according to claim 1, wherein load in the direction in which steering reaction force acts is detected from a difference of respective outputs of the first and second load detectors.

13. A testing apparatus of a steering system according to claim 1, wherein the first load detector and the second load detector are transducers which are respectively set so as to detect positive outputs when compressing, and force in the direction in which steering reaction force acts is detected from a difference of respective outputs of the transducers.

14. A testing apparatus of a steering system, having a steering-angle vibrating unit for applying, to the steering system, load in a direction in which steering reaction force acts, and a vertically-vibrating unit for applying, to the steering system, load in a direction in which road-surface reaction force acts, said testing apparatus comprising:

first links formed from a pair of parallel link portions; and second links which include a pair of parallel link portions disposed in a direction crossing said first links, each of the pair of parallel link portions of said second links being connected to said first links at two points such that one of said first links can be displaced with respect to the other in the direction in which road-surface reaction force acts and said first links can swing, wherein the vertically-vibrating unit is connected to the one of said first links via a vibrating shaft of which axial direction coincides with a vertical direction and which is integrally connected with the one of said first links at a substantially central portion in a longitudinal direction of the one of said first links, and a wheel-side connecting portion of the steering system is connected to a rear end portion of the one of said first links;

the steering-angle vibrating unit is connected to the other of said first links via a connecting mechanism which allows the other of said first links to swing about a center of rotation in a central portion of the other of said first links between the two connecting points of said second links to the other of said first links, due to load of the steering-angle vibrating unit; and transducers for detecting load are mounted to one and the other of said second links, respectively, and force in the direction in which steering reaction force acts is detected from a difference of respective outputs of the transducers.

15. A testing apparatus of a steering system according to claim 14, wherein upper and lower ends of the vibrating shaft are connected to an asymmetric link formed from an upper link section and a lower link section via ball joints, and synchronously with swinging of the one of said first links on a horizontal plane, the vibrating shaft is rotatable around the axis thereof with these ball joints serving as supporting points.

16. A testing apparatus of a steering system according to claim 14, wherein the connecting mechanism is a drive link including a front link and a parallel link, the front link being provided to be swingable on a horizontal plane and around a fixed support shaft due to actuation of a hydraulic cylinder of the steering-angle vibrating unit connected to the front link and the parallel link connecting the front link and the other of said first links.

17. A testing apparatus of a steering system according to claim 14, wherein the wheel-side connecting portion of the steering system is a rack of the steering system and is connected via a tie rod to a rear end portion of the one of said first links.

* * * * *